United States Patent Office 3,094,386
Patented June 18, 1963

3,094,386
PROCESS FOR THE MANUFACTURE OF TITANIUM DIOXIDE
Raymond James Wigginton, Luton, England, assignor to Laporte Titanium Limited, Luton, England, a British company
No Drawing. Filed Dec. 3, 1957, Ser. No. 700,271
Claims priority, application Great Britain Dec. 4, 1956
12 Claims. (Cl. 23—202)

This invention relates to a process for the manufacture of titanium dioxide from titanium-bearing ores containing iron as the main impurity.

It has previously been proposed to treat such ores by heating them with a reducing agent to reduce iron compounds present in the ore to metallic iron without producing a liquid slag and then removing metallic iron from the reduced ore by dissolution or other means to form a concentrate. The treatment is usually carried out in such a way that the concentrate contains at least about 75% of titanium calculated as $TiO_2$. The concentrate is then sulphated to bring the titanium into soluble form, the soluble titanium is dissolved in an aqueous medium, and titanium dioxide is precipitated from the solution by hydrolysis.

In order to obtain a desirable hydrolysis product for the manufacture of titanium pigments, the quantity of metallic and/or combined iron present in the material to be sulphated should be such that the ratio of titanium calculated as $TiO_2$ to iron calculated as Fe (hereinafter referred to as the $TiO_2$:Fe ratio) lies in the range from 2:1 to 6:1. In the process described above, however, the amount of iron present in the solution is insufficient for the above purpose. This difficulty may be overcome by lowering the efficiency of the reduction so that a substantial proportion of the iron compounds present in the ore are not reduced to metallic iron. This is not convenient, however, if it is desired to use a part of the reduced ore for preparing a material having a low iron content. Thus, for example, it may be desired to use a part of the reduced ore to prepare a material suitable for chlorination to form titanium tetrachloride, and for this purpose the ore should be reduced as completely as possible so that the maximum amount of iron is brought into the form of metallic iron and can be removed before the chlorination.

This invention provides a process for the manufacture of titanium dioxide from a titanium-bearing ore containing iron as the main impurity, by heating the ore with a reducing agent to reduce iron compounds in the ore to metallic iron without producing a liquid slag, the extent of the reduction being such that, immediately after the reduction, the percentage of metallic iron present is at least 80% based on the total quantity of iron present calculated as Fe, removing metallic iron from the reduced ore, sulphating to bring the titanium into soluble form, dissolving the soluble titanium in an aqueous medium and precipitating titanium dioxide from the solution by hydrolysis, wherein there is added, after the reduction and before the sulphation, a quantity of a titanium-bearing ore containing from 20 to 60% of titanium calculated as $TiO_2$ on the weight of the ore and having iron as the main impurity, the extent of the reduction, the extent of the removal of metallic iron from the reduced ore and the quantity of the added titanium-bearing ore being such that, in the material to be sulphated, the $TiO_2$:Fe ratio lies in the range from 2:1 to 6:1 and the percentage of iron present in the form of iron compounds is at least 30% calculated as Fe and based on the total iron present.

The fact that, immediately before the sulphation, at least 30% of the total iron present is in the form of iron compounds results in a sulphation product which is dry, friable and free-flowing and so can be handled easily. This advantage is especially important when the sulphation is carried out in a continuous sulphation machine of the pug mill type in which the detention time is low and the feed from the mill is by gravity.

In the material to be sulphated, the percentage of iron present in the form of iron compounds is advantageously at least 50% calculated as Fe and based on the total quantity of iron present.

Advantageously, the original titanium-bearing ore and the ore subsequently added are ilmenites and they may be the same ore.

In order to facilitate the subsequent removal of iron from the reduced ore prior to the sulphation, it is preferable that (as is known) the reduction should be carried out in the presence of a conditioning agent which, during the reduction, tends to assist the separation of metallic iron from the titanium content of the material. The conditioning agent may be, for example, calcium fluoride, a boron compound (e.g. boron oxide or boric acid), a mixture of a boron compound with a phosphate-containing material or a sodium compound (e.g. sodium hydroxide or sodium chloride).

The removal of metallic iron from the reduced ore may be effected, depending upon the state in which the iron is present, by dissolution, or by grinding the reduced ore and separating metallic iron from lighter and/or more friable material by a mechanical and/or electro-mechanical method (for example elutriation and/or electromagnetic separation).

When the removal of metallic iron is carried out other than by dissolution, the added titanium-bearing ore is preferably added after the removal of the metallic iron unless the method of removal is such as to improve the added ore (e.g. by removing gangue from it).

When the removal of metallic iron is carried out by dissolution, the added titanium-bearing ore is preferably added before the removal of the metallic iron, and the invention also includes a process for the manufacture of a concentrate from a titanium-bearing ore containing iron as the main impurity, by heating the ore with a reducing agent to reduce the iron compounds in the ore to metallic iron without producing a liquid slag, the extent of the reduction being such that, immediately after the reduction, the percentage of metallic iron present is at least 80% based on the total amount of iron present calculated as Fe, adding to the reduced ore a quantity of a titanium-bearing ore containing 20 to 60% titanium calculated as $TiO_2$ on the weight of the ore and having iron as the main impurity, and removing metallic iron from the mixture by dissolution to form a concentrate, the extent of the reduction, the extent of the removal of metallic iron from the mixture and the quantity of the added titanium-bearing ore being such that, in the concentrate, the $TiO_2$:Fe ratio lies in the range from 2:1 to 6:1 and the percentage of iron present in the form of iron compounds is at least 30% calculated as Fe and based on the total iron present.

Advantageously, in the concentrate, the percentage of iron present in the form of iron compounds is at least 50% calculated as Fe and based on the total iron present.

The addition of the titanium-bearing ore before, instead of after the removal of metallic iron results, when the removal is effected by dissolution, in the removal during the said dissolution, of a high proportion of any ferric iron compounds, and other impurities that may be present in the added ore. This removal of ferric iron compounds is desirable since it is subsequently necessary to obtain reducing conditions in order to ensure that there is present in the solution before hydrolysis a small quantity of trivalent titanium. The necessary reducing conditions are obtained by the addition of scrap iron, and the removal of the ferric iron compounds reduces the amount of scrap iron needed. This in turn reduces the amount of fresh sulphuric acid that is needed. It will be appreciated that, when the removal of metallic iron is effected by dissolution and the titanium-bearing ore is added at this stage, that is to say, before instead of after the removal of the metallic iron, rather more or has to be added in order to obtain the same $TiO_2$:Fe ratio and the same proportion of the total iron content in the form of iron compounds in the material to be sulphated owing to the removal of ferric compounds from the added ore during the dissolution.

There may be used for the dissolution of metallic iron, ferric chloride, or dilute hydrochloric acid or dilute sulphuric acid and, when sulphuric acid is used, it may be in the form of mother liquor from the hydrolysis stage. Advantageously, when mother liquor from the hydrolysis stage is used for the dissolution of iron in the reduced ore, the dissolution is carried out at a temperature of at least 70° C. as described in our co-pending British application No. 12,903/56. Advantageously, the dissolution of metallic iron is carried out at a superatmospheric pressure. The use of a superatmospheric pressure reduces the time needed for the dissolution of metallic iron and, when the added ore is added before the removal of metallic iron, results in the removal of some of the iron that is present in the form of iron compounds. Therefore, when the added ore is added before the removal of metallic iron and the dissolution is carried out under a superatmospheric pressure, a larger quantity of ore has to be added in order to obtain the same $TiO_2$:Fe ratio in the material to be sulphated and to ensure that the required proportion of iron in that material is in the form of iron compounds.

The sulphuric acid used for the sulphation may be added to the mixture in the form of oleum, as is known in the sulphation of titanium-containing materials, the sulphur trioxide in the oleum being converted into sulphuric acid by moisture present in or added to the mixture, and the heat thus evolved being used for bringing or assisting to bring the reactants to the required temperature.

There may be present, immediately before the sulphation, small quantities of reducing material, e.g. carbonaceous matter, and, if the material to be sulphated is mixed with sulphuric acid or oleum before entering the reaction vessel, this may cause partial sulphation of the material to take place prematurely before it enters the vessel. In order to avoid this, the material should be maintained at a temperature of not more than 60° C. and preferably below 30° C. while it is being fed to the reaction vessel. This may be done by external cooling, for example, by using a water jacket.

The following examples illustrate the invention, the parts being by weight:

*Example 1*

20 parts of reduced ilmenite, containing 11 parts of titanium calculated as $TiO_2$, 6.04 parts of metallic iron and 0.695 part of FeO (thus 91.9% of the total quantity of iron in the reduced ore calculated as Fe was in the form of metallic iron), were leached at 95° C. for 3 hours using 13.2 parts of $H_2SO_4$ as an aqueous solution of 16% strength. The leached material was filtered off, washed with water to remove $FeSO_4$ and excess $H_2SO_4$, and dried to form 13.18 parts of a material containing 83.4% $TiO_2$, 1.5% metallic iron and 5.31% FeO. The latter material was then mixed with 10 parts of raw ilmenite containing 3.2 parts of titanium calculated as $TiO_2$, (thus the raw ilmenite contained 32.0% of titanium calculated as $TiO_2$ on the weight of the raw ilmenite), 2.79 parts of FeO and 2.72 parts of $Fe_2O_3$, and the mixture was ground to pass a 200 mesh sieve. No $Fe_2O_3$ was removed. At this stage the $TiO_2$:Fe ratio was 2.95:1 and 96% of the total iron present (calculated as Fe) was in the form of iron compounds. 39.6 parts of sulphuric acid in the form of oleum were added to the ground mixture, which was kept at 30° C., and the mixture was then fed continuously to a sulphating machine together with a total of 7.6 parts of water to initiate the reaction. The reaction product was a friable free-flowing mass which readily dissolved in water. The resulting solution was reduced by the addition of 1.25 parts of scrap iron and was clarified to give a final solution, which was suitable for hydrolysis and in which the $TiO_2$:Fe ratio was 2.34:1.

*Example 2*

20 parts of the reduced ilmenite described in Example 1 were mixed with 10 parts of the raw ilmenite described in Example 1. The mixture was leached for 3 hours at 95° C. with 17.35 parts of sulphuric acid in the form of an aqueous solution of 16% strength and the resulting suspension was filtered and the residue washed. This resulted in the removal of substantially all the metallic iron and $Fe_2O_3$. The material was then dried to give a concentrate containing 14.2 parts of titanium (calculated as $TiO_2$) and 3.51 parts of FeO. Substantially 100% of the total iron (calculated as Fe) present in the concentrate was in the form of iron compounds and the $TiO_2$:Fe ratio in the concentrate was 5.2:1. The concentrate was ground and a quantity of oleum equivalent to 34.66 parts of $H_2SO_4$ was added to the ground concentrate, which was kept cool and fed continuously to a sulphating machine, together with a total of 6.55 parts of water to initiate the reaction. The reaction product was a friable cake which readily dissolved in water. The solution was reduced by the addition of 0.062 part of scrap iron and clarified to give a final solution, which was suitable for hydrolysis and in which the $TiO_2$:Fe ratio was 5.1:1. The amount of acid used in this Example was approximately 12.5% less than that used in Example 1.

*Example 3*

100 parts of unground ilmenite, containing 46% titanium (calculated as $TiO_2$), 42% FeO, and 8.6% $Fe_2O_3$, were intimately mixed with 15 parts of ground coke, 3 parts of fluorspar and 2 parts of soda ash and heated at 1250° C. for 4 hours to give a reduced and slightly sintered material in which 98.5% of the total quantity of iron present calculated as Fe was in the form of metallic iron. The reduced material was then wet ground in a ball mill, the fines being continuously elutriated by over-flowing from one end of the mill, and make-up water being continuously fed into the other end of the mill. The residue remaining in the mill consisted of a powder containing 96% of metallic iron. The fines were then passed through a wet magnetic separator to produce a relatively non-magnetic fraction, which was filtered and dried to give a material containing 79.2% titanium (calculated as $TiO_2$), 11.2% metallic iron and 1.29% FeO. 75 parts of this material were mixed with 25 parts of ground ilmenite containing 11 parts of titanium calculated as $TiO_2$ (thus the ground ilmenite contained 44.0% of titanium calculated as $TiO_2$ on the weight of the ground ilmenite), 9 parts of FeO and 2.8 parts of $Fe_2O_3$. 53.6% of the total iron (calculated as Fe) present in the mixture was in the form of iron compounds and the $TiO_2$:Fe ratio in the mixture was 3.89:1. 165 parts of oleum were added to the mixture which was kept cool and the mixture was then fed continuously to a sulphating machine together with a total of 31.5 parts of water to initiate the reaction. The reaction product was a friable cake which readily dissolved in water. The resulting solution was reduced by the addition of 1 part of scrap iron and was then clarified to give a final solution which was suitable for hydrolysis and in which the $TiO_2$:Fe ratio was 3.69:1.

*Example 4*

253 parts of ground ilmenite containing 110.5 parts of titanium calculated as $TiO_2$ (thus the ground ilmenite contained 43.7% of titanium calculated as $TiO_2$ or the weight of the ground ilmenite), 107 parts of FeO and 34.2 parts of $Fe_2O_3$ were mixed with 37 parts of ground reduced ilmenite containing 20.35 parts of titanium calculated as $TiO_2$, 0.76 part of FeO, and 12.0 parts of metallic iron (thus 95.3% of the total quantity of iron present calculated as Fe was in the form of metallic iron). The mixture was leached with 208 parts of sulphuric acid contained in the mother-liquor from the hydrolysis stage, which liquor was an aqueous solution of sulphuric acid of 16.8% strength. The leaching was continued for four hours and was carried out at a temperature of approximately 150° C. and under a pressure of 50 pounds per square inch gauge. The resulting suspension was cooled, filtered and washed. This resulted in the removal of all the metallic iron and a substantial proportion of $Fe_2O_3$. Because the leaching was carried out under a pressure above atmospheric pressure, some of the FeO present in the mixture was also removed. The washed solids, which amounted to 200 parts (dry weight) were found to contain 130 parts of titanium (calculated at $TiO_2$), 38.8 parts of FeO and 24.1 parts of $Fe_2O_3$. The whole of the iron present in the washed solids was in the form of iron compounds and the $TiO_2$:Fe ratio was 2.74:1. The solids, in slurry form containing 48 parts of water, were then reacted with 360 parts of sulphuric acid in the form of oleum. The product of this reaction was a friable cake which was suitable for treatment to give a pigment using the usual techniques. After reduction of the dissolved cake by the addition of 9.5 parts of metallic iron, the $TiO_2$:Fe ratio was 2.30:1.

I claim:

1. A process for the manufacture of titanium dioxide from a titanium-bearing ore containing iron as the main impurity, by heating the ore with a reducing agent to reduce iron compounds in the ore to metallic iron without producing a liquid slag, the percentage of metallic iron present immediately after the reduction being at least 80% based on the total quantity of iron present calculated as Fe, removing metallic iron from the reduced ore, sulphating to bring the titanium into soluble form, dissolving the soluble titanium in an aqueous medium and precipitating titanium dioxide from the solution by hydrolysis, wherein there is added, after the reduction and before the sulphation, a quantity of a titanium-bearing ore, which contains from 20 to 60% of titanium calculated as $TiO_2$ on the weight of the ore and has iron as the main impurity, to provide, in the material to be sulphated, a $TiO_2$:Fe ratio lying within the range from 2:1 to 6:1 and a percentage of iron present in the form of iron compounds of at least 30% calculated as Fe and based on the total iron present.

2. A process as claimed in claim 1, wherein the sulphation is carried out in a continuous sulphation machine of the pug mill type in which the detention time is low and the feed from the mill is by gravity.

3. A process as claimed in claim 1, wherein, in the material to be sulphated, the percentage of iron present in the form of iron compounds is at least 50% calculated as Fe and based on the total quantity of iron present.

4. A process as claimed in claim 1, wherein the removal of metallic iron from the reduced ore is effected by grinding the reduced ore and separating metallic iron from any lighter material and more friable material, and the added titanium-bearing ore is added after the removal of metallic iron.

5. A process for the manufacture of titanium dioxide from a titanium-bearing ore containing iron as the main impurity, by heating the ore with a reducing agent to reduce iron compounds in the ore to metallic iron without producing a liquid slag, the percentage of metallic iron present immediately after the reduction being at least 80% based on the total quantity of iron present calculated as Fe, removing metallic iron from the reduced ore by dissolution, sulphating to bring the titanium into soluble form, dissolving the soluble titanium in an aqueous medium and precipitating titanium dioxide from the solution by hydrolysis, wherein there is added, after the reduction and before the sulphation, a quantity of a titanium-bearing ore, which contains from 20 to 60% of titanium calculated as $TiO_2$ on the weight of the ore and has iron as the main impurity, to provide, in the material to be sulphated, a $TiO_2$:Fe ratio lying within the range from 2:1 to 6:1 and a percentage of iron present in the form of iron compounds of at least 30% calculated as Fe and based on the total iron present.

6. A process as claimed in claim 5, wherein the original titanium-bearing ore and the ore subsequently added are ilmenites.

7. A process as claimed in claim 5, wherein the original titanium-bearing ore and the ore subsequently added are the same ilmenite.

8. A process for the manufacture of titanium dioxide from a titanium-bearing ore containing iron as the main impurity, by heating the ore with a reducing agent to reduce iron compounds in the ore to metallic iron without producing a liquid slag, the percentage of metallic iron present immediately after the reduction being at least 80% based on the total quantity of iron present calculated as Fe, removing metallic iron from the reduced ore by dissolution in dilute sulphuric acid, sulphating to bring the titanium into soluble form, dissolving the soluble titanium in an aqueous medium and precipitating titanium dioxide from the solution by hydrolysis, wherein there is added, after the reduction and before the dissolution of metallic iron, a quantity of a titanium-bearing ore, which contains from 20 to 60% of titanium calculated as $TiO_2$ on the weight of the ore and has iron as the main impurity, to provide, in the material to be sulphated, a $TiO_2$:Fe ratio lying within the range from 2:1 to 6:1 and a percentage of iron present in the form of iron compounds of at least 30% calculated as Fe and based on the total iron present.

9. A process as claimed in claim 8, wherein the dilute sulphuric acid is used for the dissolution of metallic iron.

10. A process for the manufacture of a concentrate from a titanium-bearing ore containing iron as the main impurity, which comprises heating the ore with a reducing agent to reduce the iron compounds in the ore to metallic iron without producing a liquid slag, the percentage of metallic iron present immediately after the reduction being at least 80% based on the total amount of iron present calculated as Fe, adding to the reduced ore a quantity of a titanium-bearing ore containing from 20 to 60% of titanium calculated as $TiO_2$ on the weight of the ore and having iron as the main impurity, and removing metallic iron from the mixture by dissolution to form a concentrate in which the $TiO_2$:Fe ratio is within the range of from 2:1 to 6:1 and the percentage of iron present in the form of iron compounds is at least 30% calculated as Fe and based on the total iron present.

11. A process as claimed in claim 10, wherein the percentage of iron present in the form of iron compounds is at least 50% calculated as Fe and based on the total iron present.

12. A process as claimed in claim 10, wherein the percentage of iron present in the form of iron compounds is at least 50% calculated as Fe and based on the total iron present, and there is used, for the dissolution of metallic iron, dilute sulphuric acid.

References Cited in the file of this patent

UNITED STATES PATENTS 2,127,247    Dawson et al.    Aug. 16, 1938
2,631,924    McKinney    Mar. 17, 1953

OTHER REFERENCES

Barksdale: Titanium, The Ronald Press Co. (1949), pp. 126–127.